United States Patent
Idemura

(10) Patent No.: US 6,307,342 B1
(45) Date of Patent: *Oct. 23, 2001

(54) OPTICAL APPARATUS

(75) Inventor: Takeshi Idemura, Utsunomiya (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,041

(22) Filed: Mar. 26, 1999

(30) Foreign Application Priority Data

Mar. 31, 1998 (JP) .................................................. 10-105502
Mar. 4, 1999 (JP) .................................................. 11-056755

(51) Int. Cl.[7] ................................................ H02P 1/00
(52) U.S. Cl. ........................ 318/446; 318/445; 354/400; 356/139.06
(58) Field of Search .................................... 318/445, 446; 356/139.06; 354/400

(56) References Cited

U.S. PATENT DOCUMENTS

| | | | |
|---|---|---|---|
| 4,404,595 | 9/1983 | Ushiro et al. | 358/227 |
| 4,553,817 | 11/1985 | Ando et al. | 350/255 |
| 4,893,145 | * 1/1990 | Matsuda | 354/400 |
| 5,177,524 | 1/1993 | Tanaka | 354/400 |
| 5,227,829 | * 7/1993 | Imanari et al. | 354/400 |
| 5,463,442 | * 10/1995 | Harigaya et al. | 354/400 |
| 5,471,296 | * 11/1995 | Parker et al. | 356/139.06 |

FOREIGN PATENT DOCUMENTS 0 405 051   1/1991  (EP) .
0 439 219   7/1991  (EP) .

OTHER PUBLICATIONS

Japanese Patent Laid–Open Application No. 63–110430.

* cited by examiner

Primary Examiner—Robert E. Nappi
Assistant Examiner—Rita Leykin
(74) Attorney, Agent, or Firm—Robin, Blecker & Daley

(57) ABSTRACT

An apparatus capable of manually and electrically driving an optical unit comprising a manual operation unit for manually driving the optical unit, an electric drive unit for electrically driving the optical unit, a discrimination unit for discriminating whether the optical unit is electrically or manually driven on the basis of a drive command signal for driving the electric drive unit and a state changeover unit for switching the optical unit to an electrically driven state or a manually driven state on the basis of a discrimination result obtained with the discrimination unit.

32 Claims, 9 Drawing Sheets

OPTICAL APPARATUS

BACKGROUND OF THE INVENTION

1. Field of the Invention

The present invention relates to an optical apparatus which is suited in particular for a photographic lens used for TV photographing and so on.

2. Related Background Art

An optical apparatus used for TV photographing, etc. moves a movable lens group (not shown) held in a casing 39 in a direction along an optical axis and adjusts a stop (not shown) by manually or electrically rotating operation rings 31 which are disposed rotatably on an outer circumference of a main body 30 of the apparatus shown in FIG. 9. A motor and a control circuit for electrically driving the operation rings 31 are accommodated in a drive unit 32 disposed in the vicinity of the casing 39 of the optical apparatus 30, and driven by operating an electric control member 33 or the like disposed on an outside surface of the drive unit 32.

Switching between the manual operation and the electric drive is generally performed by operating a clutch mechanism equipped with a switching lever. In the clutch mechanism, an idler gear 37 is disposed between an operation gear 34 disposed on an operation ring 31 and an output gear 36 disposed on a motor 35 as shown in FIG. 10, and the idler gear 37 is caused to slide in an axial direction (longitudinal direction) of a shaft 38 by operating a clutch lever (not shown). The clutch mechanism is configured to engage the idler gear 37 with both the operation gear 34 and the output gear 36 at the time of the electric drive, and to disengage the idler gear 37 from the output gear 36 at the time of the manual operation, thereby switching a power transmission system for the electric drive and the manual operation of the operation ring 31.

However, such an optical apparatus requires complicated operations and tends to hinder speedy switching between the manual operation and the electric drive since it requires operation of the clutch lever of the clutch mechanism for each switching between the manual operation and the electric drive of the operation ring.

SUMMARY OF THE INVENTION

The present invention has been achieved by further developing the conventional technique described above and has a primary object to provide an optical system which has excellent operability to permit speedy switching between the manual operation and the electric drive of a movable optical unit held in a casing.

The present invention provides an optical system mainly characterized in that it is capable of manually and electrically driving an optical unit, and comprises a manual operation unit for manually driving the optical unit, an electric drive unit for electrically driving the optical unit, a discrimination unit for discriminating whether the optical unit is manually or electrically driven on the basis of a drive command signal for driving the electric drive unit and a state changeover unit for switching the optical unit to an electrically driven state or a manually driven state on the basis of a discrimination result obtained with the discrimination unit.

The present invention provides an optical system which is capable of manually and electrically driving an optical unit, and comprises a manual operation unit for manually driving the optical unit, an electric drive unit for electrically driving the optical unit, an electric operation member for outputting a drive command signal to the electric drive unit, a discrimination unit for discriminating whether the optical unit is electrically or manually driven on the basis of the drive command signal to the electric drive unit and a state changeover unit for switching the optical unit to an electrically driven state or a manually driven state on the basis of a discrimination result obtained with the discrimination unit.

Furthermore, the present invention provides an optical system which is capable of manually and electrically driving an optical unit, and comprises a manual operation unit for manually driving the optical unit, an electric drive unit for electrically driving the optical unit, an electric operation member for outputting a drive command signal to the electric drive unit, an electric operation detecting unit for detecting an operation of the electric operation member, a discrimination unit for discriminating whether the optical unit is electrically or manually driven on the basis of a detection result obtained with the electric operation detecting unit and a state changeover unit for switching the optical unit to an electrically driven state or a manually driven state on the basis of a discrimination result obtained with the discrimination unit.

DETAILED DESCRIPTION OF THE PREFERRED EMBODIMENTS

Now, the optical system according to the present invention will be described in detail with reference to FIGS. 1 through 8.

(First Embodiment)

The first embodiment exemplifies a system for moving a photographic lens which is to be used for TV photographing and so on.

Figure 1:
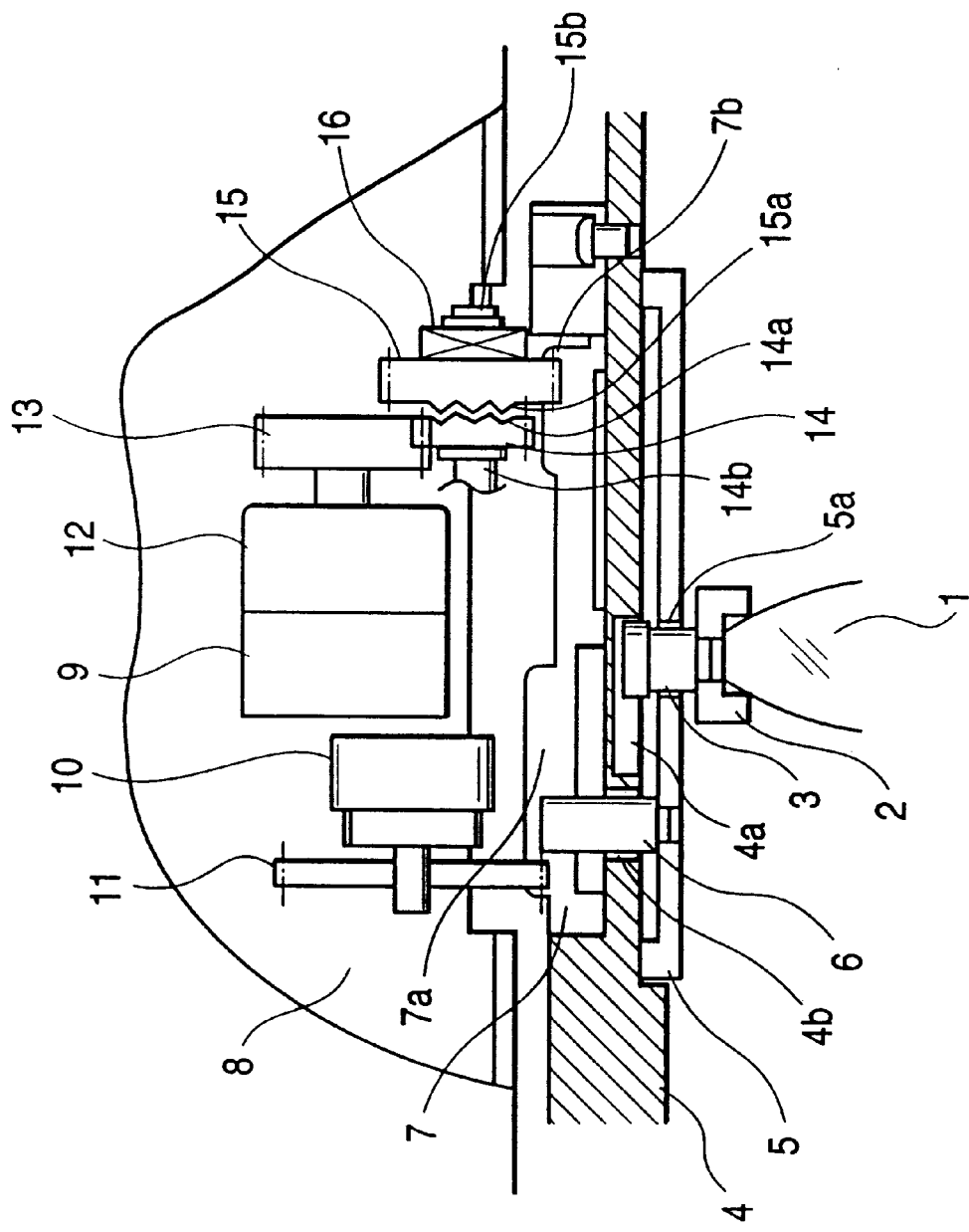
FIG. 1 is a schematic configurational view illustrating a lens drive mechanism for a moving lens group in a first embodiment of the optical system according to the present invention.
Figure 2:
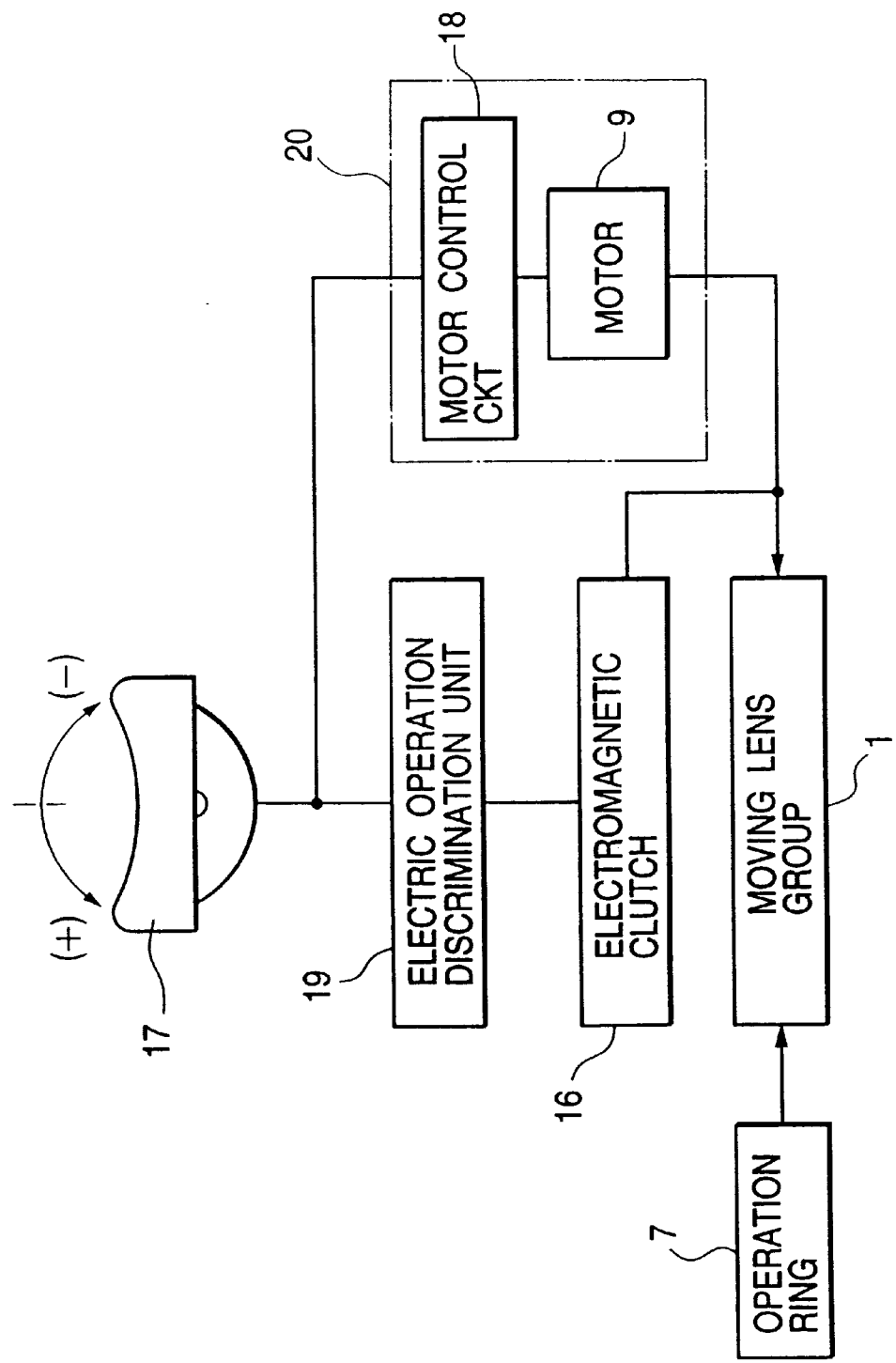
FIG. 2 is a diagram illustrating systems for the manual drive and the electric drive of the moving lens group in the first embodiment of the optical system according to the present invention.
Figure 3:
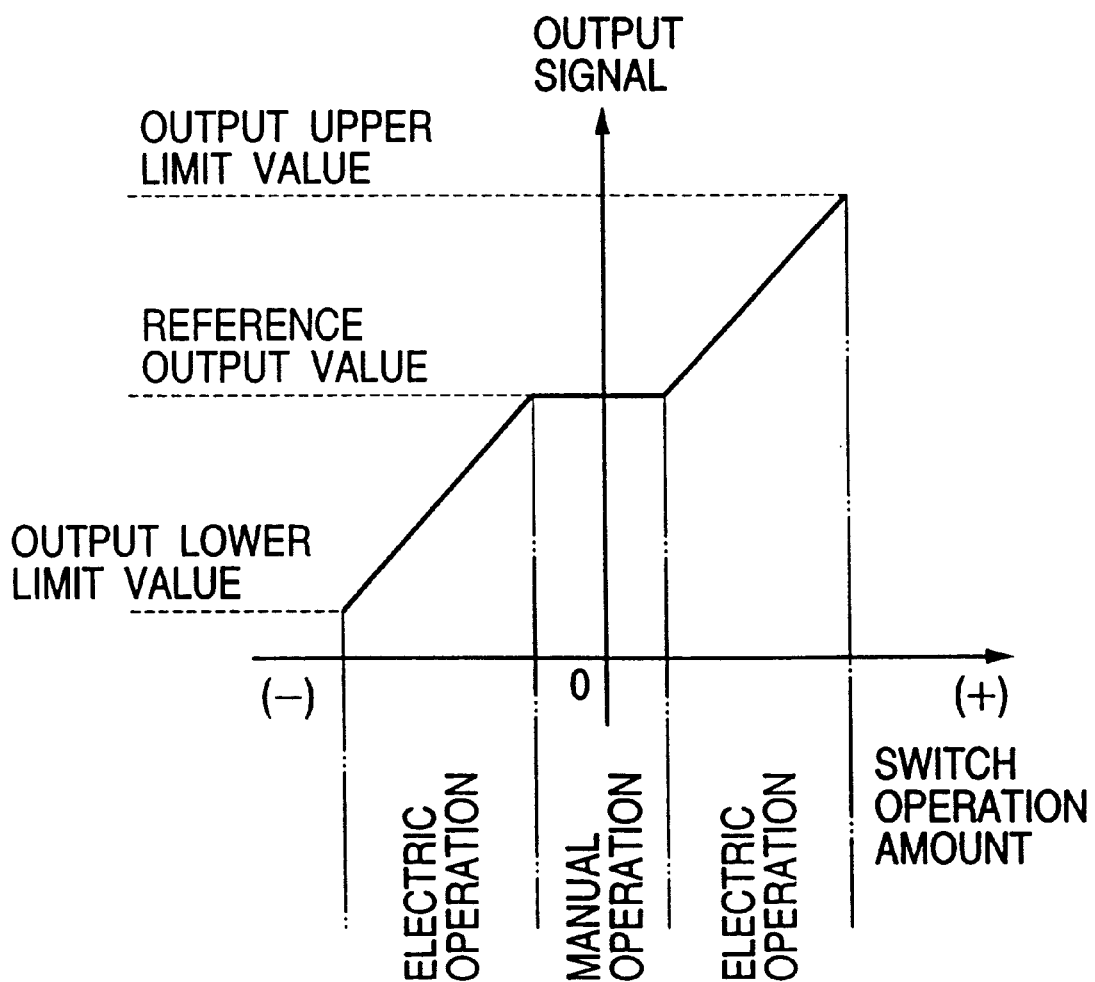
FIG. 3 is a diagram descriptive of an output signal from an electric operation member in the first embodiment of the optical system according to the present invention.

FIG. 1 is a schematic diagram showing a configuration of a lens drive mechanism for a moving lens group in the first embodiment, FIG. 2 is a diagram illustrating systems for the manual drive and the electric drive of the moving lens group in the first embodiment, and FIG. 3 is a diagram descriptive of an output signal from an electric operation member in the first embodiment.

In FIG. 1, a reference numeral 1 denotes a moving lens group consisting of a focusing lens, a zoom lens and so on which is configured as an optical unit and held in a lens barrel 2 so as to be movable in a direction along an optical axis (a right-left direction in FIG. 1). Three or more roller members 3 protrude from the lens barrel 2, and each of the roller members 3 engages with a straight groove 4a formed in a fixed cylinder 4 configured as a casing and a curved groove 5a formed in a rotating cylinder 5. A coupling pin 6 protrudes from the rotating cylinder 5, passes through a groove 4b formed in the fixed cylinder 4 and engages with an operation ring 7 provided as a manual operation member.

When the operation ring 7 is rotated in the optical system having this configuration, the rotating cylinder 5 rotates together with the operation ring 7 and the roller members 3 of the lens barrel 2 move along the straight groove 4a of the fixed cylinder 4 and the curved groove 5a of the rotating cylinder 5, thereby the moving lens group 1 moves in the direction along the optical axis in the fixed cylinder 4. At this time, the operation ends of the operation ring 7 and the moving lens group 1 are determined by an operation range of the coupling pin 6 which rotates around the optical axis in the groove 4b of the fixed cylinder 4.

Furthermore, a drive unit 8 which accommodates an electric lens moving device and a driving circuit is disposed in the vicinity of the fixed cylinder 4, and a lens driving motor (hereinafter referred to as "motor") 9 adopted as a driving source and a position detecting potentiometer 10 are disposed in the drive unit 8.

The potentiometer 10 detects a position of the moving lens group 1 by way of a position detecting gear 11 which is in mesh with a detected position gear 7a disposed on the operation ring 7. A detected position of the moving lens group 1 is used to drive and control the motor 9 so as to move the moving lens group 1 to a commanded position.

On the other hand, a driving force of the motor 9 is transmitted by way of a gear head 12 and a motor output gear 13 to an intermediate gear 14 which composes a portion of a driving force transmission mechanism. The intermediate gear 14 is supported by a support shaft 14b which is in parallel with the optical axis of the moving lens group 1 and a face gear 14a is disposed on a tip side surface of the intermediate gear 14. A coupling gear 15 which composes a portion of the driving force transmission mechanism is disposed at a location adjacent to the intermediate gear 14. The coupling gear 15 is slidably supported by a support shaft 15b which is in parallel with the optical axis of the moving lens group 1. On a tip side surface of the coupling gear 15 which is opposed to the intermediate gear 14, a face gear 15a is disposed so as to oppose to the face gear 14a of the intermediate gear 14 with a predetermined gap reserved therebetween.

An electromagnetic clutch 16 which is adopted as a changeover member is attached to the support shaft 15b of the coupling gear 15 on a side opposite to the intermediate gear 14. The electromagnetic clutch 16 is subjected to on-off control by an electric operation discrimination unit 19 described later and the support shaft 15b of the coupling gear 15 is caused to slide in an axial direction (direction of an axial line) of the support shaft 15b of the coupling gear 15, thereby engaging and disengaging the intermediate gear 14 with and from the face gear 14a of the intermediate gear 14 and the face gear 15a of the coupling gear 15 for switching between an electrically driven state and a manually driven state. Describing in more detail, the intermediate gear 14 is engaged with the coupling gear 15 when the electromagnetic clutch 16 is turned on. Accordingly, the intermediate gear 14 rotates integrally with the coupling gear 15, and the coupling gear 15 transmits a driving force of the motor 9 to the operation ring 7, thereby moving the moving lens group 1. Furthermore, when the electromagnetic clutch 16 is controlled to be turned off, the intermediate gear 14 is disengaged from the coupling gear 15 so that driving force of the motor 9 is not transmitted to the coupling gear 15 and the moving lens group 1 can be moved by manually operating the operation ring 7.

The first embodiment makes it unnecessary to perform a switching operation between the manual drive and the electric drive which is required for the conventional optical apparatus. Apparatus for this convenience will be described with reference to FIGS. 2 and 3.

FIG. 2 shows systems for the manual drive and the electric drive of the moving lens group. For the manual drive, the moving lens group 1 is mechanically moved by manipulating the operation ring 7. For the electric drive, the motor 9 is subjected to velocity control by operating an electric operation member 17 disposed on an outer surface of the optical system (an outer surface of the drive unit 8 in the first embodiment) and providing a signal having an output value varying dependently on an operation amount (drive command signal) to a motor control circuit 18 which composes a portion of an electric drive unit 20. Since the electromagnetic clutch 16 is disposed between the motor 9 and the moving lens group 1, the driving force can be transmitted from the motor 9 to the moving lens group 1 when the electromagnetic clutch. 16 is turned on for the electric drive but the driving force is not transmitted from the motor 9 to the moving lens group 1 when the electromagnetic clutch 16 is turned off for the manual drive.

That is, the electromagnetic clutch 16, the intermediate gear 14 and the coupling gear 15 compose a transmission mechanism switching unit (state changeover unit) in a system which transmits the driving force of the motor 9 to the moving lens group 1. The electromagnetic clutch 16 is turned on and off on the basis of a discrimination result obtained with the electric operation discrimination unit 19 as discriminating means described later to engage and disengage the intermediate gear 14 with and from the coupling gear 15, thereby automatically switching between the electric drive of the moving lens group 1 and the manual drive (manual operation) of the moving lens group with the operation ring 7.

In the first embodiment which adopts no selector lever for switching between the manual drive and the electric drive of the moving lens group, the manual drive or the electric drive of the moving lens group 1 is discriminated by detecting the output signal (drive command signal) from the electric operation member 17 with the electric operation discrimination unit 19 and the electromagnetic clutch 16 is operated on the basis of a discrimination result obtained with the electric operation discrimination unit 19. That is, the output signal from the electric operation member 17 is utilized to give a velocity instruction to the motor control circuit 18 and as a judging factor to detect the manual drive or the electric drive of the moving lens group 1 with the electric operation discrimination unit 19.

The electric operation member 17 comprises a seesaw switch which can be operated in plus and minus directions taking a predetermined position as standard as shown in FIG. 2 and its output signal (ordinate) varies dependently on a switch operation amount (abscissa) as shown in FIG. 3. A standard signal corresponding to a reference output value is provided while the seesaw switch is not operated.. In the middle of FIG. 3 (between a (−) side electric operation zone and a (+) side electric operation zone of a switch operation amount), there is reserved a dead zone (manual operation zone) within which the output signal is not varied by a small switch operation amount to afford an operation play for the electric operation member 17.

The electric operation discrimination unit 19 judges the zone within which the output; signal does not vary (a range within which the reference output value is constant) in FIG. 3 as the manual operation (manual drive) and judges ranges in which the output signal varies from the reference output value (a range from an output lower limit value to a (−) side reference output value and a range from a (+) side reference output value to an output upper limit value) as the electric operation (electric drive). On the basis of a discrimination result obtained from this electric operation discrimination unit 19, a portion of the power transmission system is changed over by the electromagnetic clutch 16. That is, when the electric operation discrimination unit 19 judges the electric drive on the basis of the output signal, the electromagnetic clutch 16 is turned on,, to engage or couple the intermediate gear 14 with the coupling gear 15. Accordingly, the intermediate gear 14 and the coupling gear 15 transmit a driving force of the motor 9 to the operation ring 7 for electrically driving the moving lens group 1. When the electric operation discrimination unit 19 judges the manual drive on the basis of the output signal from the electric operation member 17, it turns off the electromagnetic clutch 16, thereby disengaging the intermediate gear 14 from the coupling gear 15. Accordingly, the driving force of the motor 9 is not transmitted to the operation ring 7 any longer.

In the first embodiment, the electric operation discrimination unit 19 discriminates the electric drive or the manual drive of the moving lens group 1 on the basis of the output signal from the electric operation member 17, and operates the electromagnetic clutch 16 to engage and disengage the intermediate gear 14 with and from the coupling gear 15 during a power transmission route from the motor 9 to the moving lens group 1 on the basis of a discrimination result obtained from the electric operation discrimination unit 19, thereby automatically performing switching between the electric drive state and the manual drive state. Accordingly, the first embodiment is capable of automatically performing changeover between the electric drive and the manual drive of the moving lens group 1 with no special switching operation.

Though the electric operation discrimination unit 19 judges the manual/electric drive of the moving lens group 1 in the first embodiment on the basis of an output signal from the electric operation member 17, it is possible to equip the electric operation member 17 with a photo interrupter or the like and to dispose a separate electric operation detecting unit (not shown) which detects an operation of the electric operation member 17 so that the electric operation discrimination unit 19 discriminates the manual/electric drive of the moving lens group 1 on the basis of a result detected with the electric operation detecting unit. By disposing such an electric operation detecting unit as described above, the optical system is capable of preventing discrimination from being erroneous due to noise produced in the output signal (drive command signal) from the electric operation member 17. The electric operation member 17 may be disposed not only on an outside surface of the optical system but also on an outside of the optical system, such as a TV camera and a demand, etc.

Furthermore, the first embodiment exemplifies a case wherein the electric operation discrimination unit 19 detects the output signal from the electric operation member 17 to judge the manual/electric drive of the moving lens group 1. However, a source of such a signal is not limited to the electric operation member 17 and any signal to an electric drive unit 20 which commands the electric drive or the manual drive may be used as a signal to judge the manual/electric drive. That is, it is possible to dispose, outside the optical system, an optical system control unit (not shown) which commands the electric drive unit 20 for the electric drive or manual drive of the moving lens group 1 and configure the optical system so that the electric operation discrimination unit 19 judges the manual/electric drive of the moving lens group 1 on the basis of the command signal input from the optical system control unit to the electric drive unit 20 for the electric drive or the manual drive of the moving lens group 1.

(Second Embodiment)

The second embodiment exemplifies as an optical system an image pickup system which is used for TV photographing.

Figure 4:
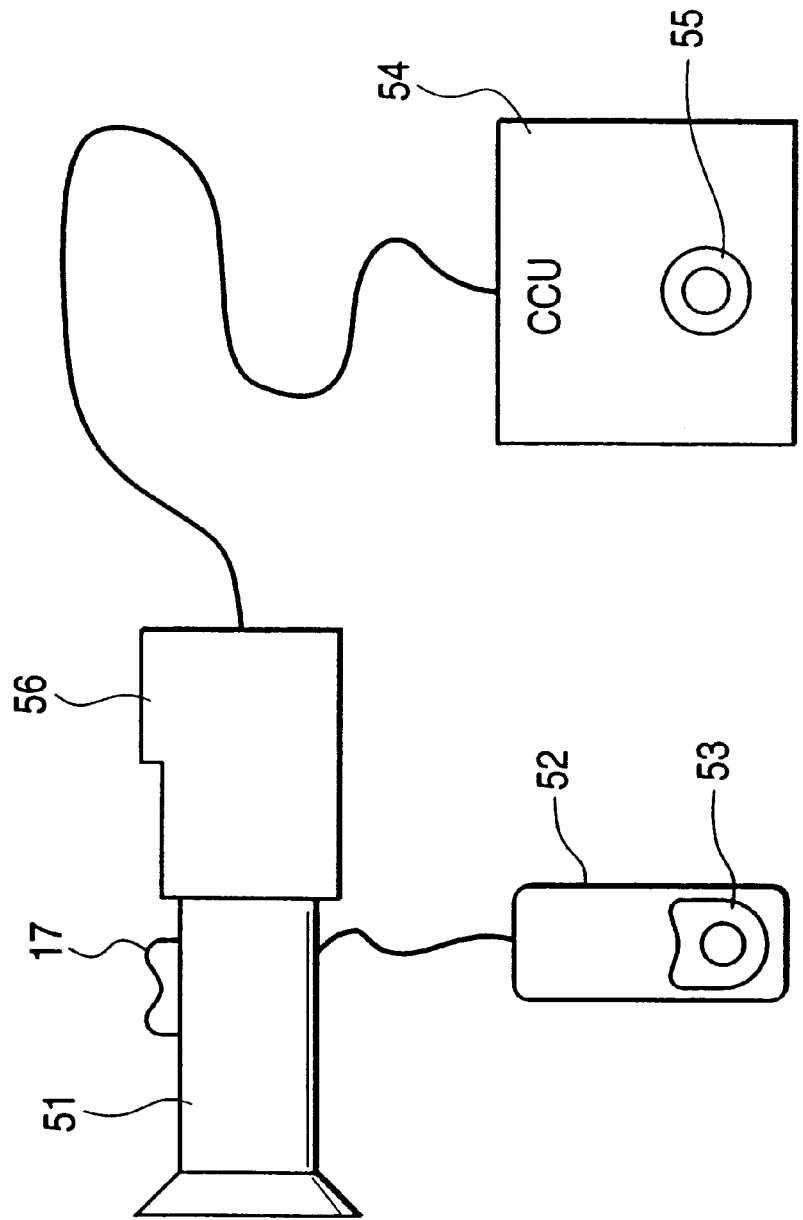
FIG. 4 is a diagram illustrating a configuration of a second embodiment of the optical system according to the present invention.
Figure 5:
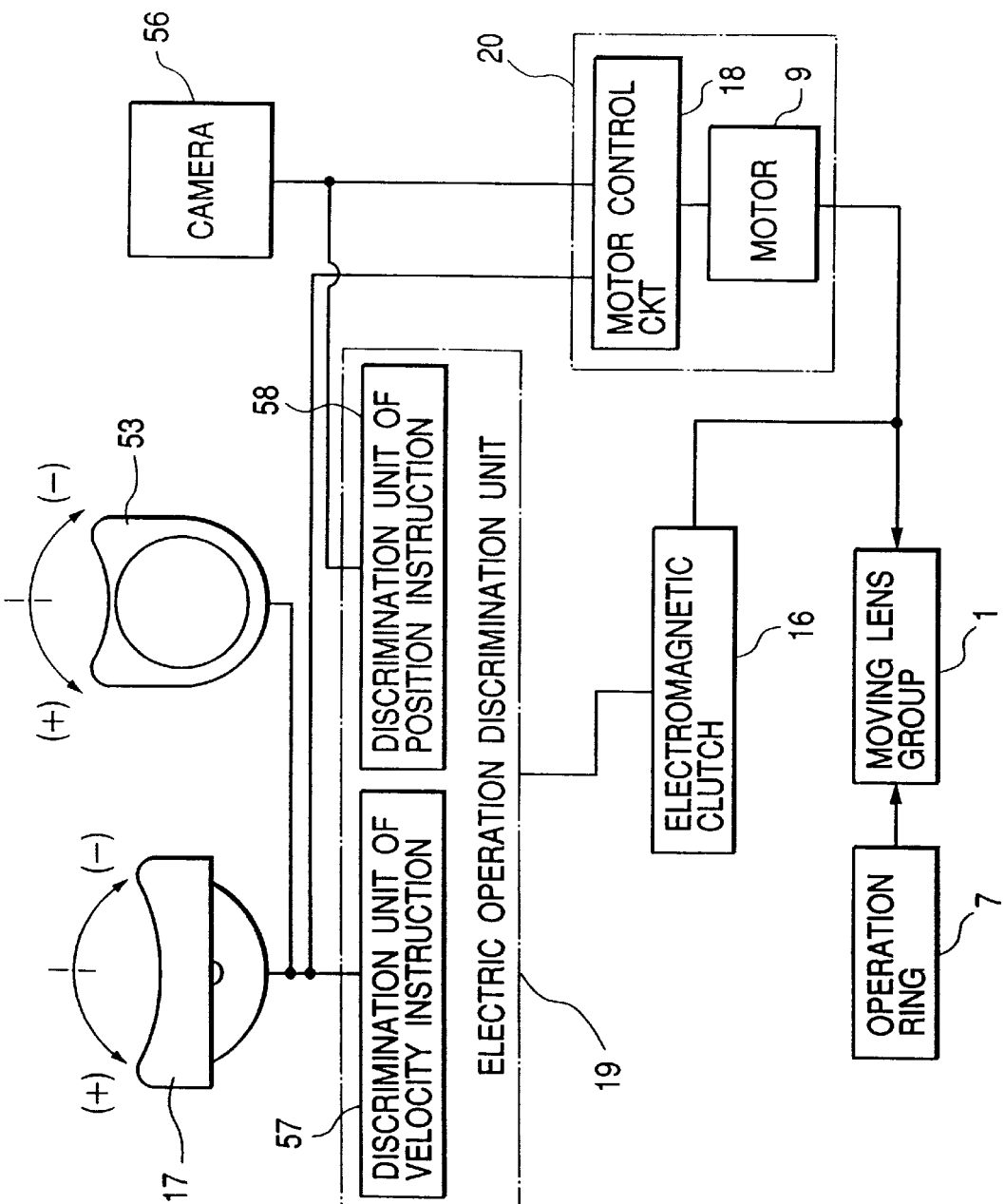
FIG. 5 is a diagram illustrating systems for the manual drive and the electric drive of a moving lens group in the second embodiment of the optical system according to the present invention.

FIGS. 4 and 5 show the optical system preferred as the second embodiment. FIG. 4 shows a configuration of the optical system preferred as the second embodiment.

In FIG. 4, a reference numeral 51 denotes a lens unit (photographing lens system). The electric operation member 17 which is used in the first embodiment described above is attached to the lens unit 51. Furthermore, a demand 52 is connected to the lens unit 51 and the moving lens group 1 (see FIG. 1) which is disposed in the lens unit 51 can be electrically driven by operating an electric operation member 53 disposed on the demand 52.

A reference numeral 54 denotes a camera control unit (hereinafter referred to as "CCU") adopted as an optical system control unit. An electric operation member 55 is disposed on the CCU 54. The CCU 54 is configured to drive the moving lens group 1 in the lens unit 51 by way of a TV camera body (hereinafter referred to as "camera") 56 with a control signal output from the electric operation member 55.

In the optical system having the configuration described above, a cameraman's operation to drive the moving lens group 1 using the electric operation member 17 on the lens unit 51 or the electric operation member 53 on the demand 52 is referred to as a local operation. On the other hand, an operation to drive the moving lens group 1 which is performed by an operator other than the cameraman at a location apart from the camera 56 using the CCU 54 is referred to as a remote operation.

FIG. 5 shows a block diagram of the lens unit of the optical system preferred as the second embodiment.

In a manual drive mode, the optical system preferred as the second embodiment allows the moving lens group 1 to be driven by manipulating an operation ring 7 as described with reference to the first embodiment. In an electric drive mode, on the other hand, three drive command sources provided as a plurality of signal generator sources output control signals (drive command signals) to an electric drive unit 20. A first drive command source is an electric operation member 17 which is disposed on an outside surface of the lens unit 51 as in the first embodiment and a second drive command source is an electric operation member 53 which is disposed on the demand 52. These two electric operation members 17 and 53 perform velocity control of a motor 9 by providing control signals having output values varying dependently on an operation amount to a motor control circuit 18 which composes a portion of the electric operation unit 20. A third drive command source is the camera 56, and a control signal generated by the CCU 54 is input from the camera 56 into the lens unit 51 and provided to the motor control circuit 18 composing the portion of the electric drive unit 20 so that the motor 9 controls a position of the moving lens group 1.

An electromagnetic clutch 16 is disposed between the motor 9 and the moving lens group 1 similarly as in the first embodiment. At the time of the electric drive mode, the electromagnetic clutch 16 is turned on to engage the intermediate gear 14 with the coupling gear 15 in the driving force transmission mechanism shown in FIG. 1 so that a driving force of the motor 9 can be transmitted to the moving lens group 1. When the optical system is not set in the electric drive mode, the electromagnetic clutch 16 is turned off to disengage the intermediate gear 14 from the coupling gear 15 so that the driving force of the motor 9 is not transmitted to the moving lens group 1.

The second embodiment which does not have any selector lever for selection between the manual drive and the electric drive of the moving lens group 1 similarly as the first embodiment also discriminates the manual/electric drive of the moving lens group 1 by detecting output signals (drive command signals) from the electric operation members 17, 53 and the camera 56 at the same time with an electric operation discrimination unit 19. The second embodiment operates the electromagnetic clutch 16 on the basis of a discrimination result obtained with the electric operation discrimination unit 19.

The electric operation discrimination unit 19 shown in the second embodiment comprises of a discrimination unit of velocity instruction 57 adopted as a first discrimination unit and a discrimination unit of position instruction 58 adopted as a second discrimination unit so that the optical system can discriminate the manual/electric drive of the moving lens group 1 in both a velocity instruction control mode and a position instruction control mode.

More specifically, since the electric operation member 17 on the outer surface of the lens unit 51 and the electric operation member 53 on the demand 52 provide velocity instructions as output signals, the discrimination unit of velocity instruction 57 judges, like the electric operation discrimination unit 19 described with reference to the first embodiment, a range within which the output signals do not vary from a reference value as the manual operation (manual mode) and judges a range within which the output signals vary from the reference value as the electric operation (electric mode). And, when the discrimination unit of velocity instruction 57 judges the manual mode on the basis of the output signals from the electric operation member 17 on the lens unit 51 and the electric operation member 53 on the demand 52, the electromagnetic clutch 16 is turned off to disengage the intermediate gear 14 from the coupling gear 15. Thereby, the driving force of the motor 9 is not transmitted to an operation ring 7. Furthermore, when the discrimination unit of velocity instruction 57 judges the electric mode on the basis of the output signals from the electric operation member 17 on the lens unit 51 and the electric operation member 53 on the demand 52, the electromagnetic clutch 16 is turned on to engage the intermediate gear 14 with the coupling gear 15. Thereby, the intermediate gear 14 and the coupling gear 15 transmit the driving force of the motor 9 to the operation ring 7 to electrically drive the moving lens group 1.

Since the camera 53 provides position instructions as its output signals, on the other hand, the discrimination unit of position instruction 58 is configured to judge the manual operation (manual mode) when a difference between signal values (output values) of the output signals is zero and to judge the electric operation (electric mode) when the difference is not zero. When the difference is zero, the discrimination unit of position instruction 58 turns off the electromagnetic clutch 16, thereby disengaging the intermediate gear 14 from the coupling gear 15. Accordingly, the driving force of the motor 9 is not transmitted to the operation ring 7 any longer. When the difference is not zero, the discrimination unit of position instruction 58 turns on the electromagnetic clutch 16, thereby engaging the intermediate gear 14 with the coupling gear 15. Accordingly, the intermediate gear 14 and the coupling gear 15 transmit the driving force of the motor 9 to the operation ring for electrically driving the moving lens group 1.

In the second embodiment, the electric operation discrimination unit 19 judges the electric drive or the manual drive of the moving lens group 1 in both the control mode by the output signals provided as velocity instructions from the electric operation member 17 on the lens unit 51 and the electric operation member 53 on the demand 52 and the control mode by the output signals from the camera 56 provided as position instructions, and the electromagnetic clutch 16 automatically engages or disengages the intermediate gear 14 with or from the coupling gear 15 in a power transmission system from the motor 9 to the moving lens group 1 on the basis of a discrimination result obtained with the electric operation discrimination unit 19.

Though the two discrimination units 57 and 58 are disposed in the second embodiment to cope with both the velocity instructions and the position instructions, only the discrimination unit of velocity instruction may be disposed, for example, when only velocity instructions are used in the electric mode. When the two electric operation members 17, 53 and the camera 56 output control signals (drive command signals) at the same time, the optical system preferred as the second embodiment electrically drives the moving lens group 1 on the basis of a signal composed of these control signals.

Accordingly, the second embodiment is capable of automatically selecting the electric drive or the manual drive of the moving lens group 1 with no special switching operation not only when it is operated by a cameraman using the electric operation member 17 on the outside surface of the lens unit 51 but also when it is operated at the same time by another operator who is located at a remote place and uses the demand 52 or the CCU 54 for photographing with a tripod. Therefore, the second embodiment makes it possible to provide an optical system which can exhibit excellent operability in various photographing conditions.

Though the electric operation discrimination unit 19 judges the manual/electric drive of the moving lens group 1 on the basis of the output; signals (control signals) from the electric operation members 17, 53 and 55 in the second embodiment, it is possible to equip the electric operation members; 17, 53 and 55 with photo interrupters or the like and dispose a separate electric operation detecting unit (not shown) which detects operations of the electric operation members 17, 53 and 55 so that the electric operation discrimination unit 19 can judge the manual/electric drive of the moving lens group 1 on the basis of a detection result obtained with the electric operation detecting unit. When such a separate electric operation detecting unit is disposed as described above, the optical system is capable of preventing the discrimination from being erroneous due to noise produced in the output signals (drive command signals) from the electric operation members 17, 53 and 55.

(Third Embodiment)

The third embodiment exemplifies as an optical system an image pickup system which is to be used for TV photographing like the second embodiment.

The optical system preferred as the third embodiment has a configuration which is the same as that of the optical system preferred as the second embodiment. Therefore, members of the third embodiment which are common to the second embodiment will be represented by the same reference numerals with no description in particular.

Figure 6:
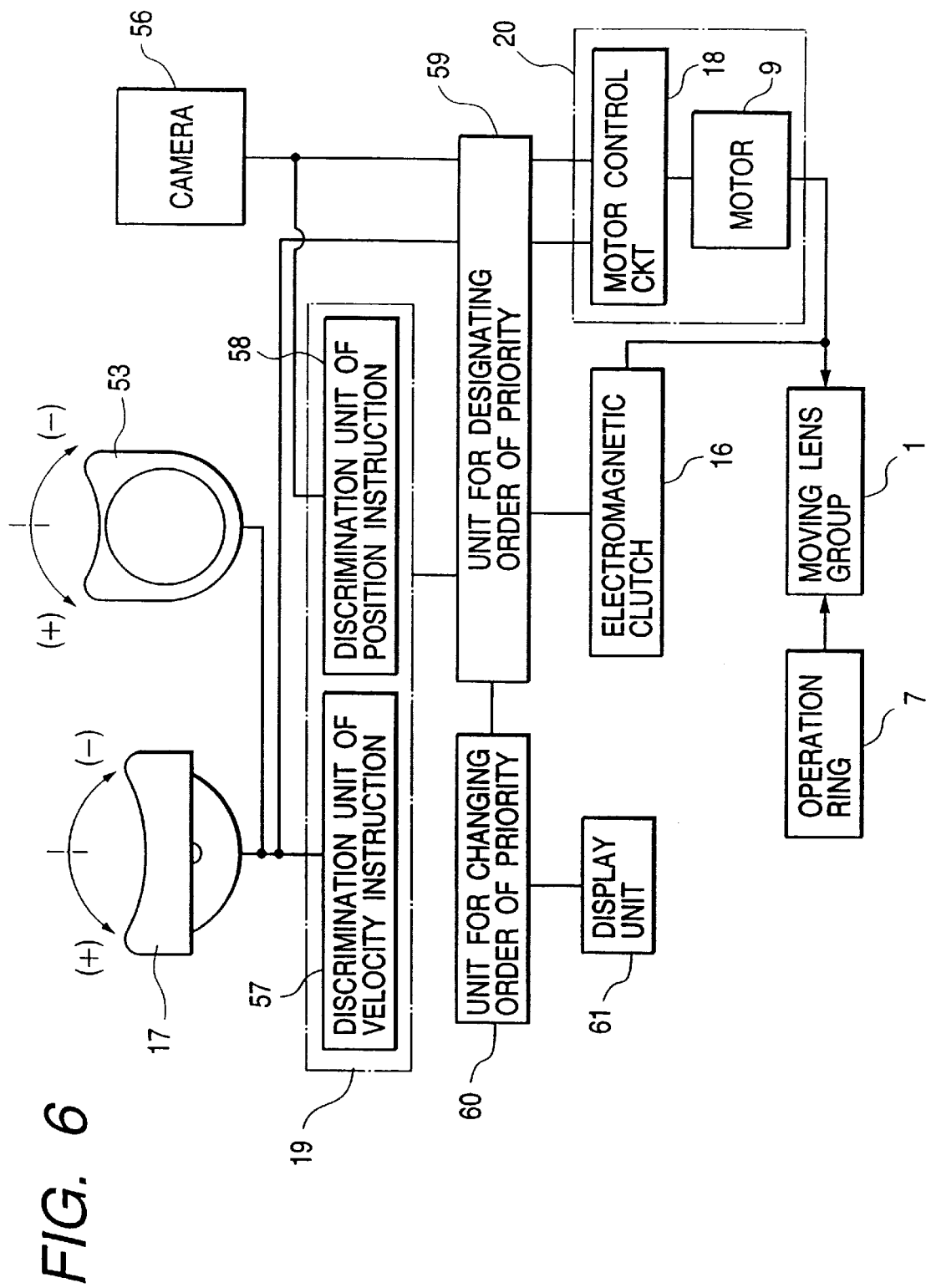
FIG. 6 is a diagram illustrating systems for the manual drive and the electric drive of the moving lens group in a third embodiment of the optical system according to the present invention.

FIG. 6 shows a block diagram of the lens unit of the optical system preferred as the third embodiment.

Like the second embodiment, the third embodiment uses an electric operation member 17 disposed on an outside surface of a lens unit 51, an electric operation member 53 on a demand 52 and a camera 56 as three drive command sources (control signal generating sources) which generate control signals (drive command signals) for electrically driving a moving lens group 1.

In contrast to the second embodiment which electrically drives the moving lens group 1 on the basis of the signal composed of the control signals when the drive command sources 17, 53 and 56 generate the control signals at the same time, the third embodiment is characterized by comprising a unit for designating order of priority 59 which preferentially designates a control signal when the drive command sources 17, 53 and 56 generate control signals at the same time.

Speaking concretely, a discrimination unit of velocity instruction 57 is disposed for the electric operation member 17 and the electric operation member 53 which are disposed on an outside surface of a lens unit 51 and on the demand, and a discrimination unit of position instruction 58 is disposed for a camera 56 so that the discrimination unit of velocity instruction 57 and the discrimination unit of position instruction 58 compose an electric operation discrimination unit 19. The discrimination unit of velocity instruction 57 discriminates electric/manual drive of the moving lens group 1 as in the second embodiment and the discrimination unit of position instructon 58 discriminates the electric/manual drive of the moving lens group 1 also as in the second embodiment. A discrimination result of the electric/manual drive of the moving lens group 1 obtained from the electric operation discrimination unit 19 and control signals from the three drive command sources 17, 53 and 56 are sent to the unit for designating order of priority 59.

When the three drive command sources 17, 53 and 56 generate drive command signals, i.e., control signals for electrically driving the moving lens group 1 (electric drive command signals) at the same time, the unit for designating order of priority 59 designates one of the control signals according to a predetermined priority order determination algorithm. The unit for designating order of priority 59 controls the motor 9 by sending the control signal to a motor control circuit 18 and simultaneously turns on an electromagnetic clutch 16, thereby engaging the intermediate gear 14 with the coupling gear 15 shown in FIG. 1. Accordingly, the intermediate gear 14 and the coupling gear 15 transmit a driving force of the motor 9 to the operation ring 7 for electrically driving the moving lens group 1.

A unit for changing order of priority 60 permits selecting a priority order determination algorithm for the unit for designating order of priority 59 out of a plurality of algorithms, thereby allowing a priority order to be changed dependently on purposes of use, and one of the drive command sources 17, 53 and 56 which is preferentially selected can be confirmed on a display unit 61.

The unit for designating order of priority 59 designates one of control signals when the three drive command sources 17, 53 and 56 generate control signals for electrically driving the moving lens group 1 at the same time. In other conditions, the optical system performs on-off control of the electromagnetic clutch 16 on the basis of a discrimination result of electric/manual drive of the moving lens group 1 obtained with the electric operation discrimination unit 19 to automatically engage or disengage the intermediate gear 14 with or from the coupling gear 15 similarly as the second embodiment.

Accordingly, the third embodiment is capable of performing automatic switching between the electric drive and the manual drive of the moving lens group 1 with no special switching operation not only when a cameraman operates the electric operation member 17 on the outside surface of the lens unit 51 but also when an operator other than the cameraman uses the demand 52 or the CCU 54 for photographing with a tripod at a remote place. Therefore, the third embodiment makes it possible to provide an optical system which exhibits excellent operability in various photographing conditions and provides favorable operating environments by preventing the moving lens group 1 from being erroneously moved even when the cameraman and the CCU operator try the electric drive at the same time by accident.

Though the electric operation discrimination unit 19 judges the manual/electric drive of the moving lens group 1 on the basis of the output signals (control signals) from the electric operation members 17, 53 and 55 in the third embodiment, it is possible to equip the electric operation members 17, 53 and 55 with photo interrupters or the like and dispose a separate electric operation detecting unit (not shown) which detects operations of the electric operation members 17, 53 and 55 so that the electric operation discrimination unit 19 can discriminate the manual/electric drive of the moving lens group 1 on the basis of a detection result obtained with the electric operation detecting unit. When such a separate electric operation detecting unit is disposed as described above, the optical system is capable of preventing discrimination from being erroneous due to noise produced in the output signals (drive command signals) from the electric operation members 17, 53 and 55.

(Fourth Embodiment)

The fourth embodiment exemplifies as an optical system an image pickup system which is to be used for TV photographing and so on like the second embodiment.

The optical system preferred as the fourth embodiment has a configuration which is the same as that of the optical system preferred as the second embodiment. Therefore, members which are common to the optical system preferred as the second embodiment will be represented by the same reference numerals with no description in particular.

Figure 7:
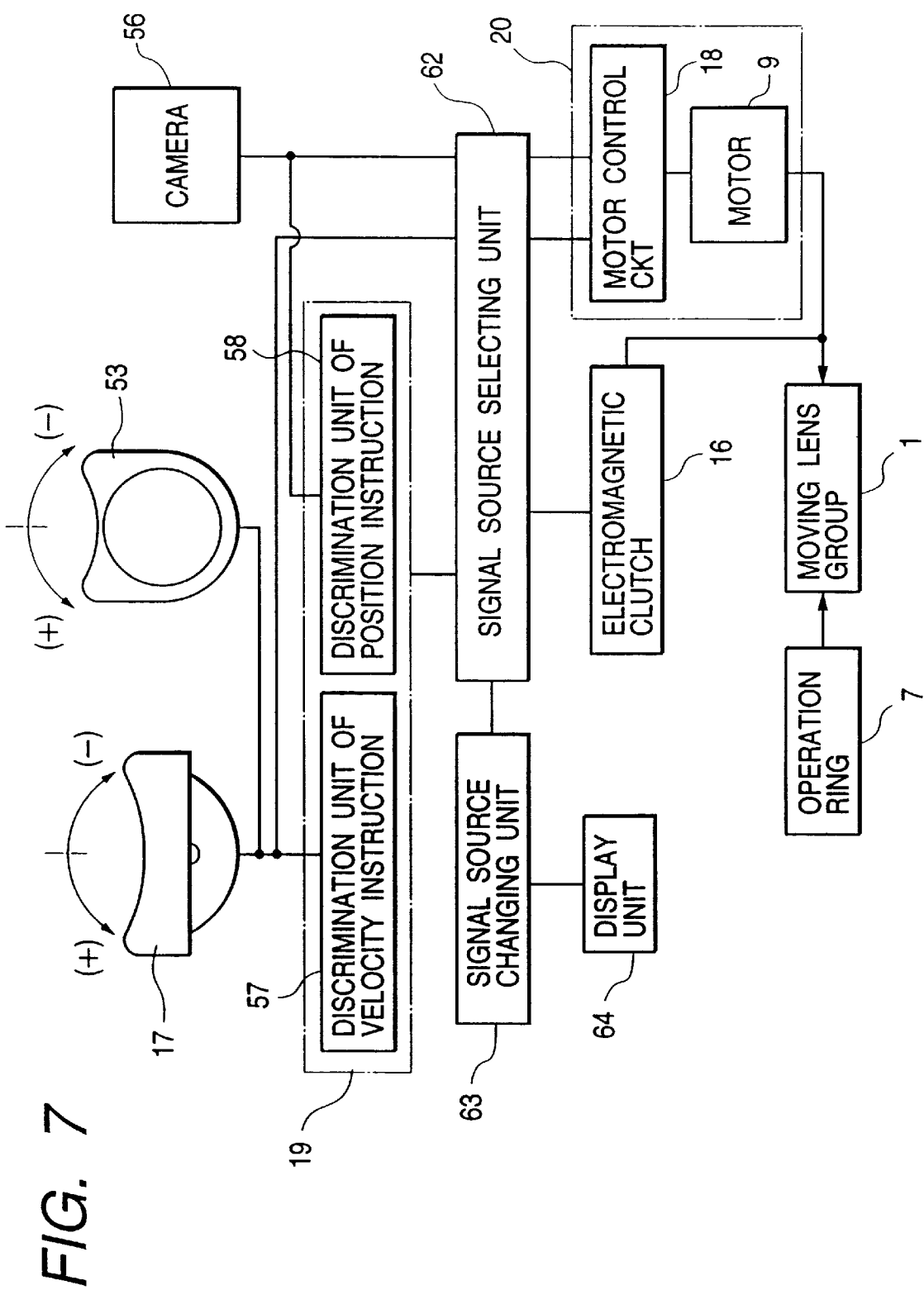
FIG. 7 is a diagram illustrating systems for the manual drive and the electric drive of the moving lens group in a fourth embodiment of the optical system according to the present invention.

FIG. 7 shows a block diagram of the lens unit of the optical system preferred as the fourth embodiment.

Like the optical system preferred as the second embodiment, the optical system preferred as the fourth embodiment uses an electric operation member 17 disposed on an outside surface of a lens unit 51, an electric operation member 53 disposed on a demand 52 and a camera 56 as three drive command sources (control signal generating sources) which generate control signals (drive command signals) for electrically driving a moving lens group 1.

In the second and third embodiments, the moving lens group 1 can be electrically driven with the control signals (drive command signals) from the three drive command sources 17, 53 and 56. When the optical system is operated, for example, by both a cameraman who electrically operates the moving lens group 1 using the electric operation member 17 on the lens unit 51 and the electric operation member 53 on the demand 52, and an operator who electrically operates the moving lens group 1 with the CCU 54 at a location apart from the lens unit 51, however, it may be preferable to allow only the operator to electrically operate the moving lens group 1 and invalidate electric operation by the cameraman.

The fourth embodiment is characterized by comprising a signal source selecting unit 62 which invalidates electric drive by drive command signals from specific drive command sources (for example, the electric operation members 17 and 53) even when the drive command signals are provided.

That is, a discrimination unit of velocity instruction 57 is provided for an electric operation member 17 disposed on an outside surface of a lens unit 51 and an electric operation member 53 on a demand 52, and a discrimination unit of position instruction 58 is provided for a camera 56 so that the discrimination unit of velocity instruction 57 and the discrimination unit of position instruction 58 composes an electric operation discrimination unit 19. The discrimination unit of velocity instruction 57 discriminates electric/manual drive of the moving lens group 1 as in the second embodiment and the discrimination unit of position instruction 58 discriminates the electric/manual drive of the moving lens group 1 also as in the second embodiment. A discrimination result of the electric/manual drive of the moving lens group 1 obtained with the electric operation discrimination unit 19 and control signals from the three drive command sources 17, 53 and 56 are sent to the signal source selecting unit 62.

The signal source selecting unit 62 turns off an electromagnetic clutch 16, thereby invalidating engagement (coupling) between an intermediate gear 14 land a coupling gear 15 as well as electric drive of the moving lens group 1 whether or not the specific control signal generating sources 17 and 53 provide electric drive command signals (drive command signals instructing the electric drive of the moving lens group 1). An electric drive signal from a drive command source 56 other than the specific drive command sources 17 and 53 mentioned above is provided to a motor control circuit 18 to control a motor 9 and is used to turn on the electromagnetic clutch 16 to electrically drive the moving lens group 1 similarly as the cases of the second and third embodiments.

The signal source selecting unit 62 is equipped with a signal source changing unit 63 which selects one of electric drive command signals from the plurality of drive command sources 17, 53 and 56 which is used for automatic switching from the manual drive to the electric drive of the moving lens group 1. The signal source changing unit 63 is capable of validating a control signal (electric drive command signal) from the camera 56 only, for example, and invalidating the control signals (electric drive command signals) from the electric operation member 17 on the lens unit 51 and the electric operation member 53 on the demand 52 or validating the control signals (electric drive command signals) from the electric operation member 17 on the lens unit 51 and the electric operation member 53 on the demand 52 only and invalidating the control signal (electric drive command signal) from the camera 56. Furthermore, it is possible to invalidate all the control signals instructing the electric drive of the moving lens group 1 so that the moving lens group 1 can be operated only manually by a cameraman which manipulates the operation ring 7. Though the control signals from the electric operation member 17 on the lens unit 51 and the electric operation member 53 on the demand 52 are processed collectively, it is possible to process these signals independently. Furthermore, the signal source changing unit 63 is equipped with a display unit 64 which displays selected conditions of the plurality of drive command sources 17, 53 and 56 to permit confirming conditions of the plurality of drive command sources 17, 53 and 56 which are set (selected) by the signal source selecting unit 62.

Therefore, the fourth embodiment is capable of performing automatic switching between the electric drive and the manual drive of the moving lens group 1 with no special switching operation not only when it is operated by a cameraman who manipulates the electric operation member 17 on the outside surface of the lens unit 51 but also when it is operated by another operator who uses the demand 52 and the CCU 54 for photographing with a tripod at a remote place. Accordingly, the fourth embodiment makes it possible to provide an optical system which exhibits excellent operability in various photographing conditions and provides favorable photographing environments matched with various photographing conditions by allowing electric operation to be performed not by both the cameraman and the CCU operator but preferentially by only a single operator.

Though the electric operation discrimination unit 19 judges the manual/electric drive of the moving lens group 1 on the basis of the output signals (control signals) from the electric operation members 17, 53 and 55 in the fourth embodiment, it is possible to equip the electric operation members 17, 53 and 55 with photo interrupters or the like and dispose a separate electric operation detecting unit (not shown) which detects operations of the electric operation members 17, 53 and 55 so that the electric operation discrimination unit 19 can discriminate the manual/electric drive of the moving lens group 1 on the basis of a detection result obtained with the electric operation detecting unit. When such a separate electric operation detecting unit is disposed, the optical system is capable of preventing discrimination from being erroneous due to noise produced in the output signals (drive command signals) from the electric operation members 17, 53 and 55.

(Fifth Embodiment)

The fifth embodiment exemplifies as an optical system an image pickup system which is to be used for TV photographing, etc., like the second embodiment.

The optical system preferred as the fifth embodiment has a configuration which is the same as that of the optical system preferred as the second embodiment. Therefore, members which are common to the optical system preferred as the second embodiment will be represented by the same reference numerals with no particular description.

Figure 8:
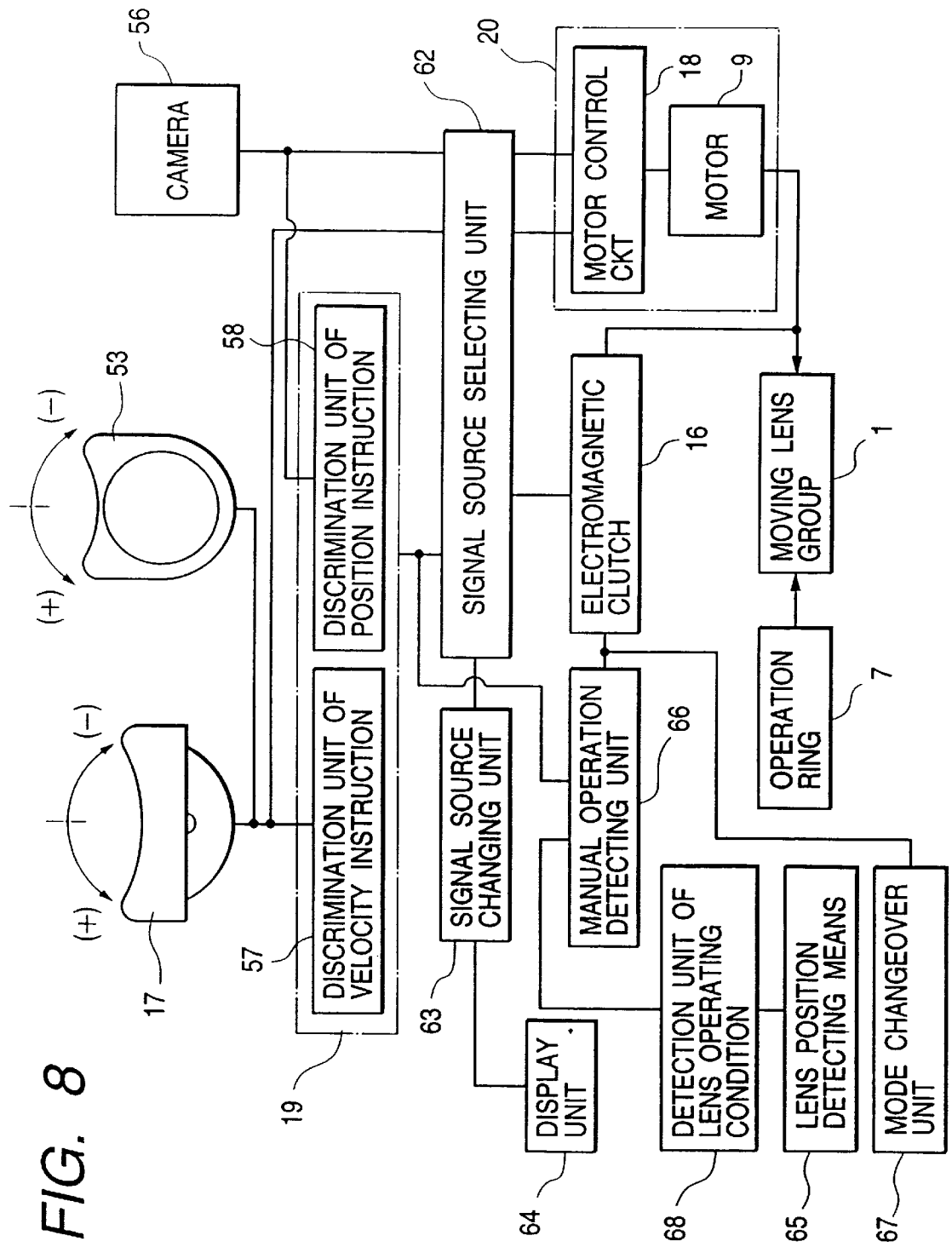
FIG. 8 is a diagram illustrating systems for the manual drive and the electric drive of the moving lens group in a fifth embodiment of the optical system according to the present invention.
Figure 9:
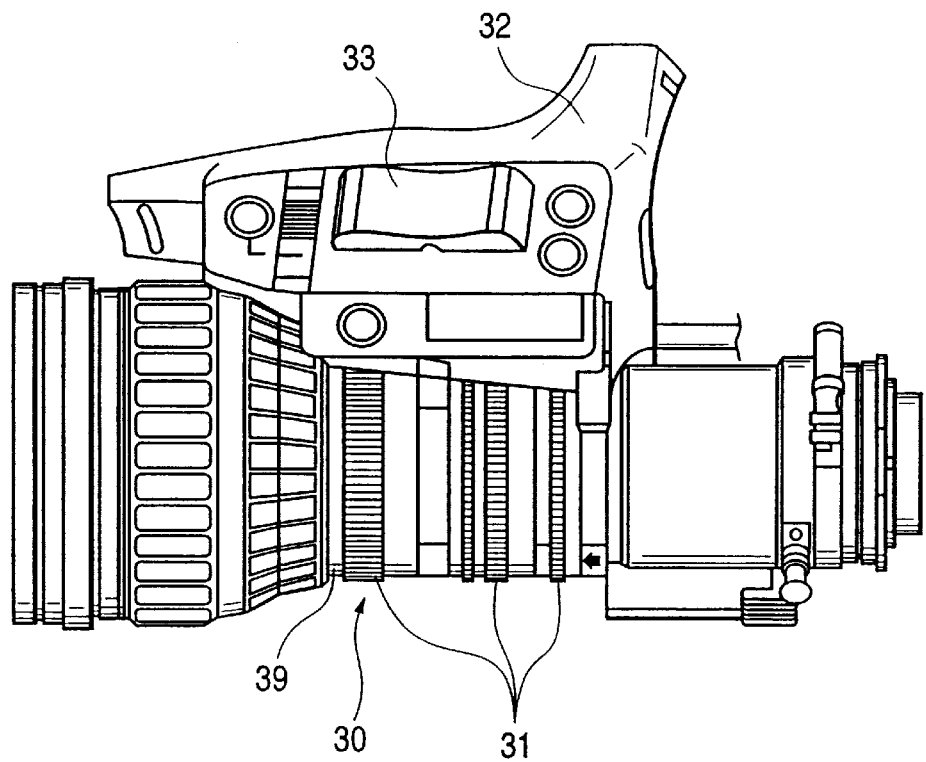
FIG. 9 is an external view of a conventional optical apparatus.
Figure 10:
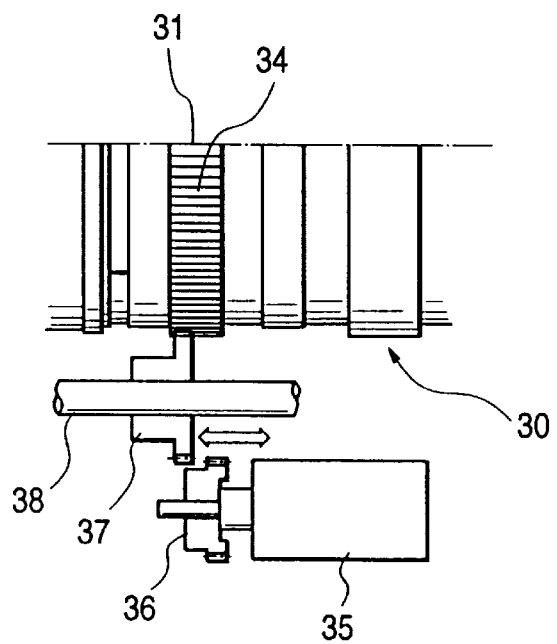
FIG. 10 is a schematic diagram showing a configuration of a clutch mechanism of the conventional optical apparatus.

FIG. 8 shows a block diagram of the lens unit of the optical system preferred as the fifth embodiment.

Like the second, third or fourth embodiment, the fifth embodiment uses an electric operation member 17 disposed on the outside surface of a lens unit 51, an electric operation member 53 on a demand and a camera 56 as three drive command sources (control signal generating sources) which generate control signals (drive command signals) for electrically driving a moving lens group 1. The fifth embodiment is characterized in that it does not turn on an electromagnetic clutch 16 for switching to electric drive of a moving lens group 1 during a manual operation and maintains a manual mode even when any of the drive command sources 17, 53 and 56 provides an electric drive command signal (drive command signal instructing electric drive of the moving lens group 1).

FIG. 8 shows a block diagram consisting of the block diagram shown in FIG. 7 and a diagram illustrating the characteristic of the fifth embodiment. Only the characteristics of the present invention will be described below in detail.

In FIG. 8, a reference numeral 66 represents a manual operation detecting unit which detects whether or not a cameraman is operating a manual ring of the optical system. An electric operation discrimination unit 19 discriminates whether the moving lens group 1 is being driven electrically or not (manual mode), but does not function to discriminate whether or not the moving lens group 1 is being driven manually or not. A reference numeral 65 designates lens position detecting means which detects a position of the moving lens group 1. A reference numeral 68 denotes a detection unit of lens operating condition which detects whether the moving lens group 1 moves from a difference value detected by the lens position detecting means 65 or stops.

The manual operation detecting unit 66 detects whether or not the cameraman is operating the manual ring on the basis of two detection results obtained with the detection unit of lens operating condition 68 and the electric operation discrimination unit 19. When the detection unit of lens operating condition 68 detects a movement of the moving lens group 1 and the electric operation discrimination unit 19 provides a discrimination result indicating the manual mode, the optical system judges that the manual operation is started and detects a time until the detection unit of lens operating condition 68 detects stop of the moving lens group 1 as a manual operation time.

Once the manual operation detecting unit 66 detects the manual operation, the fifth embodiment makes the electromagnetic clutch 16 ineffective to engage (couple) the intermediate gear 14 with the coupling gear 15 and invalidates the electric drive of the moving lens group 1 regardless of an electric drive command signal which is provided in the course of the manual operation. Since a time till stop of the moving lens group 1 is judged as a manual operation time once the manual operation detecting unit 66 judges that the manual operation is started, a detection result of the manual operation detecting unit 66 indicating the manual operation time remains unchanged even when the electric operation discrimination unit 19 discriminates an electric operation on the basis of the control signals from the electric operation members 17 and 53 during a manual operation of the operation ring 7.

Furthermore, a reference numeral 67 represents a mode changeover unit enabling to select a manual preferential mode in which the moving lens group 1 cannot be driven electrically during the manual operation described above and a normal mode in which the electric drive is selected on the basis of a control signal indicating the electric drive (electric drive command signal) even during the manual operation as described with reference to the first through fourth embodiments.

Therefore, the fifth embodiment is capable of automatically selecting the electric drive and the manual drive of the moving lens group 1 with no special switching operation not only when it is operated by a cameraman who manipulates the electric operation member 17 on an outside surface of a lens unit 51 but also when it is operated by another operator who uses the demand 52 and the CCU 54 for photographing with a tripod at a remote location. Accordingly, the fifth embodiment makes it possible to provide an optical system which exhibits excellent operability in various photographing conditions and provides favorable operating environments matched with various photographing conditions by forming a condition where a manual operation by the cameraman is preferential to operation by the CCU operator.

Though the electric operation discrimination unit 19 judges the manual/electric drive of the moving lens group 1 on the basis of the output signals (control signals) from the electric operation members 17, 53 and 55 in the fifth embodiment, it is possible to equip the electric operation members 17, 53 and 55 with photo interrupters or the like and dispose a separate electric operation detecting unit (not shown) which detects operations of the electric operation members 17, 53 and 55 so that the electric operation discrimination unit 19 discriminates the manual/electric drive of the moving lens group 1 on the basis of a detection result obtained with the electric operation detecting unit. When such EL separate electric operation detecting unit is disposed, the optical system is capable of preventing discrimination from being erroneous due to noise produced in the output signals (drive command signals) from the electric operation members 17, 53 and 55.

Since the fifth embodiment is configured to discriminate the electric drive or the manual drive of the optical unit by the electric operation discrimination unit on the basis of drive command signals which are provided from inside and outside the optical system to the electric drive unit to instruct a drive and automatically select manual or electric drive of the optical unit with the transmission changeover mechanism on the basis of the discrimination result, the fifth embodiment is capable of automatically selecting the manual and electric drive of the optical unit with no special changeover operation with a clutch lever which is required for the conventional optical apparatus.

Since the fifth embodiment is configured to discriminate the electric drive or manual drive of the optical unit by the electric operation discrimination unit on the basis of the drive command signals which are provided from the electric operation members to the electric drive unit or the operations of the electric operation members which are detected with the electric operation detecting unit and automatically select the manual drive or the electric drive of the optical unit with the transmission changeover mechanism on the basis of the discrimination result, the fifth embodiment is capable of automatically selecting the manual drive or the electric drive of the optical unit with no special changeover operation with a clutch lever which is required for the conventional optical apparatus.

Furthermore, since the fifth embodiment is capable of automatically selecting the manual drive or the electric drive of the optical unit with no special changeover operation even when it is operated simultaneously by an operator other than a cameraman who uses the demand and the CCU for photographing with a tripod at a remote place in addition to the electric operation member on the outside surface of the optical system, the fifth embodiment makes it possible to provide an optical system which exhibits excellent operability in various photographing conditions.

Though moving lens groups such as focusing lenses and zoom lenses are exemplified as optical units in the embodiments described above, any optical unit such as an iris or a macro lens may be used as an optical unit in the optical system according to the present invention.

Moreover, the optical system according to the present invention is applicable not only to the photographing lenses exemplified in the embodiments described above but also to any optical apparatus such as a tripod head.

As described above, the present invention provides an optical system which is capable of automatically selecting the manual drive or the electric drive of optical means with no special changeover operation, thereby permitting speedy changeover between the manual drive and the electric drive, and featuring excellent operability.

What is claimed is:

1. An apparatus capable of manually and electrically driving an optical unit comprising:

a manual operation unit for manually driving said optical unit;

an electric drive unit for electrically driving said optical unit;

a first operation unit adapted to be connected to a casing which holds said optical unit, said first operation unit for remote operation of said optical unit by said electric drive unit having a first operation member for outputting a first command signal to said electric drive unit, said first command signal outputted from said first operation member being a first reference signal which is outputted when the first operation member is not being operated or a first drive signal which is outputted in correspondence to an operation amount when the first operation member is being operated;

a second operation member provided on said casing for outputting a second command signal to said electric drive unit, said second command signal outputted from said second operation member being a second reference signal which is outputted when the second operation member is not being operated, or a second drive signal which is outputted when in correspondence to an operation amount when the second operation unit is being operated;

a discrimination unit for discriminating whether said first operation member is being operated or not on the basis of said first command signal from said first operation member and for discriminating whether said second operation member is being operated or not on the basis of said second command signal from said second operation member; and a state changeover unit for switching said optical unit to an electrically driven state or a manually driven state on the basis of a discrimination result obtained with said discrimination unit.

2. The apparatus according to claim 1, wherein said state changeover unit automatically changes over a portion of a power transmission system from a driving source for said electric drive unit to said optical unit.

3. An apparatus according to claim 1, wherein said state changeover unit switches said optical unit to an electrically driven state or a manually driven state by engaging or disengaging an engageable or disengageable driving force transmission mechanism disposed in a portion of a power transmission system from a driving source for said electric drive unit on the basis of a discrimination result obtained with said discrimination unit to said optical unit.

4. The apparatus according to claim 1, wherein said discrimination unit preferentially selects said manually driven state when it discriminates that said optical unit is manually driven.

5. The apparatus according to claim 1 comprising a signal preferential unit which preferentially designates any one of drive signals from said plurality of operation members.

6. An apparatus according to claim 1, wherein said discrimination unit discriminates electric drive or manual drive of said optical unit on the basis of an output condition of the drive signal to said electric drive unit.

7. An apparatus according to claim 1, wherein the manual operation unit has an operation ring, and said operation ring is rotated upon electric driving.

8. An apparatus according to claim 1, wherein said discrimination unit discriminates that the first operation member and the second operation member are not being operated when said first reference signal and said second reference signal are being outputted from said first operation member and said second operation member, respectively, and that said first operation member or said second operation member is being operated when said first drive signal from said first operation member or second drive signal from second operation member is being outputted, and wherein said state changeover unit switches said optical unit to a manually driven state upon the discrimination result by said discrimination unit that said first operation member and said second operation member are not being operated, and said state changeover unit switches said optical unit to an electrically driven state upon the discrimination result by said discrimination unit that said first operation member or said second operation member is being operated.

9. An apparatus capable of manually and electrically driving an optical unit comprising:

a manual operation unit for manually driving said optical unit;

an electric drive unit for electrically driving said optical unit;

a first operation unit adapted to be connected to a casing which holds said optical unit, said first operation unit for remote control of said optical unit by said electric drive unit having a first operation member for outputting a first drive signal to said electric drive unit;

a second operation member provided on said casing for outputting a second drive signal to said electric drive unit;

operation detecting means for detecting movement of the first operation member caused by operation of said first operation member and for detecting movement of the second operation member caused by operation of the second operation member;

a discrimination unit for discriminating whether said first operation member is being operated or not and whether said second operation member is being operated or not on the basis of a detection result of said operation detecting means; and a state changeover unit for switching said optical unit to an electrically driven state or a manually driven state on the basis of a discrimination result obtained with said discrimination unit.

10. An apparatus according to claim 9, wherein first operation detecting means and second operation detecting means are provided in correspondence to said first and second operation members.

11. The apparatus according to claim 10 comprising an algorithm preferentially designating an electric drive signal when electric drive signals are input into said electric drive unit simultaneously from said plurality of operation members and a unit for changing order of priority which selects a command signal according to the algorithm.

12. The apparatus according to claim 10 comprising a signal preferential unit which preferentially designates any one of drive signals from said plurality of operation members.

13. The apparatus according to claim 9, wherein said state changeover unit automatically changes over a portion of a power transmission system from a driving source for said electric drive unit to said optical unit.

14. The apparatus according to claim 9, wherein said state changeover unit switches said optical unit to an electrically driven state or a manually driven state by engaging or disengaging an engageable or disengageable driving force transmission mechanism disposed in a portion of a power transmission system from a driving source for said electric drive unit to said optical unit on the basis of a discrimination result obtained with said discrimination unit.

15. The apparatus according to claim 9, wherein said discrimination unit discriminates electric drive or manual drive of said optical unit on the basis of an output condition of the drive signal to said electric drive unit.

16. The apparatus according to claim 9, wherein said discrimination unit preferentially selects said manually driven state when it discriminates that said optical unit is manually driven.

17. An apparatus according to claim 9, wherein the manual operation unit has an operating ring, and said operation ring is rotated upon electric driving.

18. An apparatus according to claim 9, wherein said operation detecting means is a photo interrupter which detects positions at which said first operation member and said second operation member are not being operated and positions at which said first operation member and said second operation member are being operated.

19. An apparatus capable of manually and electrically driving an optical unit comprising:
a manual operation unit for manually driving said optical unit;
an electric drive unit for electrically driving said optical unit;
a first operation unit adapted to be connected to a casing which holds said optical unit, said first operation unit for remote control of said optical unit by said electric drive unit having a first operation member for outputting a first command signal to said electric drive unit, said first command signal outputted from the first operation member being a first reference signal which is outputted when the first operation member is not being operated or a first drive signal which is outputted in correspondence to an operation amount when the first operation member is being operated;
a discrimination unit for discriminating whether said first operation member is being operated or not on the basis of said first command signal from said first operation member; and
a state changeover unit for switching said optical unit to an electrically driven state or a manually driven state on the basis of a discrimination result obtained with said discrimination unit.

20. The apparatus according to claim 19, wherein said state changeover unit automatically changes over a portion of a power transmission system from a driving source for said electric drive unit to said optical unit.

21. An apparatus according to claim 19, said state changeover unit switches said optical unit to an electrically driven state or a manually driven state by engaging or disengaging an engageable or disengageable driving force transmission mechanism disposed in a portion of a power transmission system from a driving source for said electric drive unit on the basis of a discrimination result obtained with said discrimination unit to said optical unit.

22. An apparatus according to claim 19, wherein said discrimination unit discriminates electric drive or manual drive of said optical unit on the basis of an output condition of the drive signal to said electric drive unit.

23. An apparatus according to claim 19, wherein said discrimination unit preferentially selects said manually driven state when it discriminates that said optical unit is manually driven.

24. An apparatus according to claim 19, wherein the manual operation unit has an operation ring, and said operation ring is rotated upon electric driving.

25. An apparatus according to claim 19, wherein said discrimination unit discriminates that said first operation member is not being operated when said first reference signal is being outputted from said first operation member, and that said first operation member is being operated when said first drive signal is being outputted from said first operation member, and wherein said state changeover unit switches said optical unit to a manually driven state upon the discrimination result by said discrimination unit that said first operation member is not being operated and said state changeover unit switches said optical unit to an electrically driven state upon the discrimination result by said discrimination unit that said first operation member is being operated.

26. An apparatus capable of manually and electrically driving an optical unit comprising:
a manual operation unit for manually driving said optical unit;
an electric drive unit for electrically driving said optical unit;
a first operation unit adapted to be connected to a casing which holds said optical unit, said first operation unit for remote control of said optical unit by said electric drive unit having a first operation member for outputting a first drive signal to said electric drive unit;
operation detecting means for detecting movement of the first operation member caused by operation of said first operation member;
a discrimination unit for discriminating whether said first operation member is being operated or not on the basis of a detection result of said operation detecting means; and
a state changeover unit for switching said optical unit to an electrically driven state or a manually driven state on the basis of a discrimination result obtain with said discrimination unit.

27. An apparatus according to claim 26, wherein said state changeover unit automatically changes over a portion of a power transmission system from a driving source for said electric drive unit to said optical unit.

28. An apparatus according to claim 26, wherein said state changeover unit switches said optical unit to an electrically driven state or a manually driven state by engaging or disengaging an engageable or disengageable driving force transmission mechanism disposed in a portion of a power transmission system from a driving source for said electric drive unit to said optical unit on the basis of a discrimination result obtained with said discrimination unit.

29. The apparatus according to claim 26, wherein said discrimination unit discriminates electric drive or manual drive of said optical unit on the basis of an output condition of the drive signal to said electric drive unit.

30. The apparatus according to claim 26, wherein said discrimination unit preferentially selects said manually driven state when it discriminates that said optical unit is manually driven.

31. An apparatus according to claim 26, wherein the manual operation unit has an operating ring, and said operation ring is rotated upon electric driving.

32. An apparatus according to claim 26, wherein said operation detecting means is a photo interrupter which detects a position at which said first operation member is not being operated and a position at which said first operation member is being operated.

* * * * *

UNITED STATES PATENT AND TRADEMARK OFFICE
CERTIFICATE OF CORRECTION

PATENT NO. : 6,307,342 B1
DATED : October 23, 2001
INVENTOR(S) : Takeshi Idemura It is certified that error appears in the above-identified patent and that said Letters Patent is hereby corrected as shown below:

<u>Column 5,</u>
Line 10, delete "operated.." and insert -- operated. --.
Line 31, delete "on,," and insert -- on, --.

<u>Column 14,</u>
Line 22, delete "EL separate" and insert -- a separate --.

Signed and Sealed this

Twenty-first Day of May, 2002

Attest:

Attesting Officer

JAMES E. ROGAN
*Director of the United States Patent and Trademark Office*